United States Patent [19]

Olavson

[11] Patent Number: 4,816,042

[45] Date of Patent: Mar. 28, 1989

[54] SCRUBBER-EXHAUST GAS CONDITIONER

[75] Inventor: Lars G. Olavson, Salt Lake City, Utah

[73] Assignee: Baker International Corporation, Orange, Calif.

[21] Appl. No.: 101,073

[22] Filed: Sep. 25, 1987

[51] Int. Cl.$^4$ ............................................. B01D 47/00
[52] U.S. Cl. ..................................... 55/92; 55/95; 55/235; 55/248; 55/255; 55/257 PV; 55/DIG. 30
[58] Field of Search ................ 55/95.92, 249, 248, 55/250, 255, 256, DIG. 30, 257 R, 257 PV, 257 MD, 446, 235

[56] References Cited

U.S. PATENT DOCUMENTS

| | | | |
|---|---|---|---|
| 917,185 | 4/1909 | Taylor | 55/257 R |
| 1,428,950 | 9/1922 | Edens | 55/249 |
| 2,287,592 | 6/1942 | Andrews | 55/444 |
| 3,464,189 | 9/1969 | Mergenthaler | 261/77 |
| 3,976,456 | 8/1976 | Alcock | 60/310 |
| 3,980,458 | 9/1976 | Berthoud | 55/255 |

FOREIGN PATENT DOCUMENTS

| | | | |
|---|---|---|---|
| 889056 | 12/1981 | U.S.S.R. | 55/256 |
| 1975 | of 1907 | United Kingdom | 55/256 |
| 1517115 | 7/1978 | United Kingdom | 60/310 |

*Primary Examiner*—Bernard Nozick
*Attorney, Agent, or Firm*—Stanley J. Price, Jr.

[57] ABSTRACT

A conditioner for cooling and cleaning hot exhaust gas containing particulates has an enclosure partially filled with liquid and a gas conditioning means positioned within the enclosure. Hot exhaust gas entering the conditioning means passes through a liquid induction portion submerged in the liquid to introduce a portion of the liquid into the hot gas stream within the gas conditioner means to form a gas-liquid mixture. The hot exhaust gas-liquid mixture then flows through a contact portion of the conditioning means in which cooling of the hot exhaust gas takes place through vaporization of at least a portion of the liquid. The cooled exhaust gas-liquid mixture is then passed through a separator portion of the conditioning means in which the direction of the flow of the cooled exhaust gas-liquid mixture is changed. Separation of the cooled exhaust gas from at least a portion of the liquid and particulates occurs through a centrifugal action of the mixture within the separator portion of the conditioning means. The liquid and particulates removed from the cooled exhaust gas return to the pool of liquid within the enclosure. The cleaned and cooled exhaust gas impinges on a barrier type separator to remove additional liquid entrained in the cooled exhaust gas. The cooled exhaust gas then passes through an outlet opening in the enclosure to the atmosphere.

7 Claims, 2 Drawing Sheets

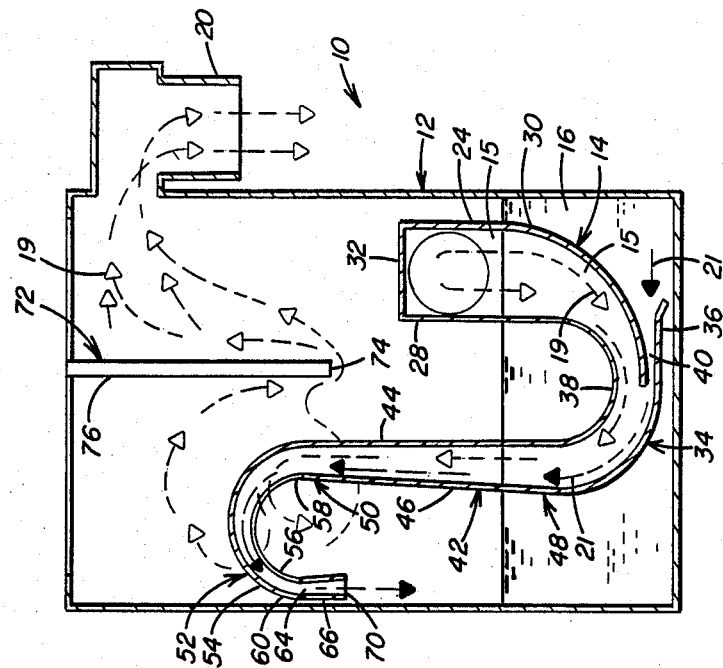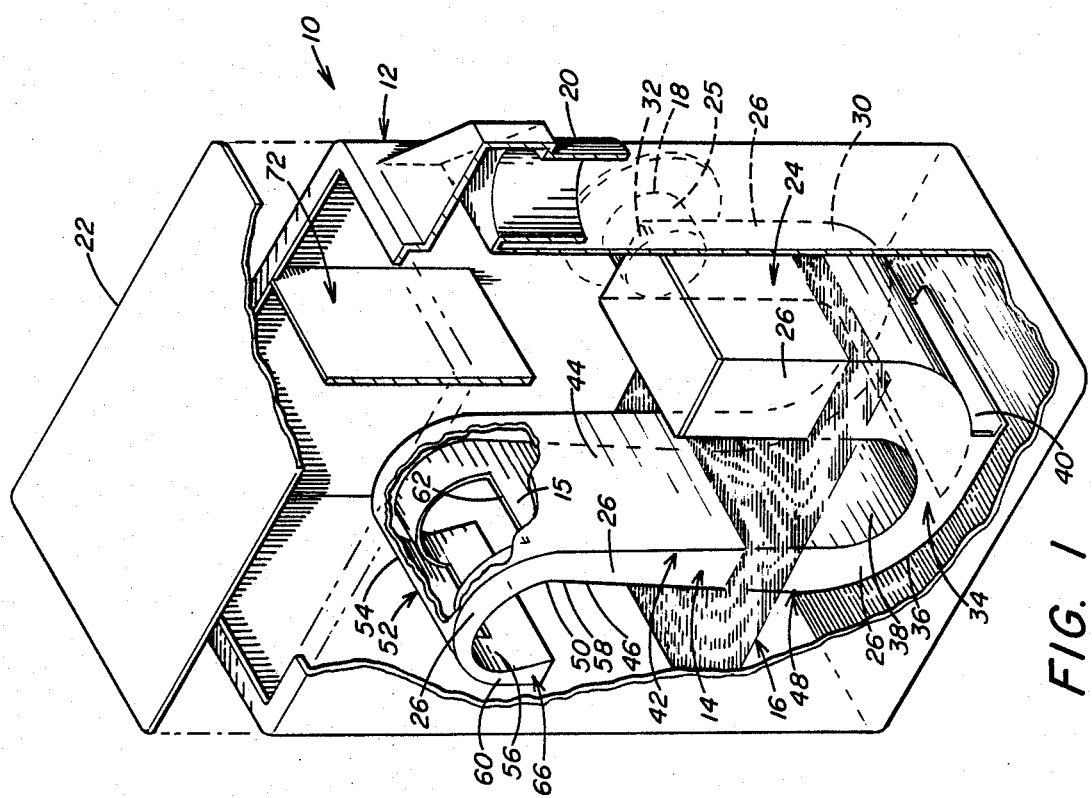

SCRUBBER-EXHAUST GAS CONDITIONER

BACKGROUND OF THE INVENTION

1. Field of the Invention

This invention relates to an exhaust gas conditioning device, and more particularly, to a conditioning device for cooling hot exhaust gas by forming a hot exhaust gas-liquid mixture and thereafter separating the liquid from the cooled exhaust gas by centrifugal action.

2. Description of the Prior Art

It is well known that internal combustion engines normally discharge hot exhaust gas containing particulates to atmosphere. The discharge of hot exhaust gas containing particulates from vehicles propelled by internal combustion engines and used in underground mining environments is particularly hazardous to mining personnel working around these vehicles. For example, mining pesonnel could be injured if the hot exhaust gas ignites any combustible elements present in the mine, or be burned by the hot exhaust gas itself. In addition, the hot exhaust gas contains particulates which are unsafe for human inhalation.

In an attempt to reduce the temperature of the hot exhaust gas discharged by internal combustion engines used on underground mining vehicles and remove particulates suspended in the exhaust gas, various exhaust gas conditioners have been utilized.

U.S. Pat. No. 3,316,693 discloses an exhaust gas treating device which includes a perforated flame tube positioned within the treating device tank for receiving exhaust gas from a diesel engine. The flame tube is perforated to reduce back pressure losses to the engine. The exhaust gas is passed from the flame tube into a cylindrical expansion chamber positioned around the flame tube to expand the exhaust gas. After expansion, the exhaust gas enters a vertical tube which extends into a scrubbing liquid in the tank. The exhaust gas is discharged through the vertical tube into the liquid and passes upwardly through the scrubber liquid after striking a protector plate positioned on the bottom of the exhaust gas tank. The mixture of exhaust gas and liquid then follows a generally upward path and impinges upon helixical veins positioned on the outside of the vertical flow tube.

U.S. Pat. No. 3,485,015 discloses an exhaust gas scrubber which includes a housing containing a plurality of chambers. An inlet pipe introduces exhaust gas into at least one of the chambers. The exhaust gas passes through several chambers containing a fume scrubbing liquid, and after scrubbing, the gases are discharged through an outlet pipe. The inlet pipe divides the exhaust gas into a plurality of paths each containing separate fume scrubbing chambers. After the exhaust gas is separated and passed through the plurality of chambers, the gas is recombined at a location adjacent the outlet of the scrubber.

U.S. Pat. No. 3,561,194 discloses an exhaust gas conditioner wherein exhaust gases introduced into the conditioner are passed through water-filled chambers to be cooled and scrubbed by contact with the water.

U.S. Pat. No. 3,886,738 discloses a diesel engine for use in mines in which the exhaust system for the engine includes a liquid cooled exhaust manifold, apparatus for injecting a water spray into the exhaust gas flowing from the manifold to cool the exhaust gas, and a scrubber which functions as an exhaust arrester and an exhaust gas diluter to remove contaminants from the exhaust gas.

U.S. Pat. No. 3,967,941 discloses an exhaust gas liquid contactor for removing particulate matter from hot exhaust gas in which water vapor is added to the exhaust gas and thereafter the exhaust gas is cooled to cause condensation of the water vapor in the exhaust gas into water droplets surrounding the particulate matter. The exhaust gas-water droplet mixture is passed through a filter to remove the water droplets from the exhaust gas and thereby simultaneously remove the particulates from the exhaust gas.

U.S. Pat. No. 3,976,456 discloses an exhaust gas scrubber which includes an enclosure partially filled with a liquid having an inlet above the liquid level. A tube positioned in the enclosure is connected to the enclosure inlet and extends downwardly below the water level, then changes direction to extend upwardly with constantly increasing cross-section and with at least some portion of the tube in curvature to an open end within the enclosure and above the liquid level. Orifices in the submerged portion of the tube emit water droplets which are drawn into and mixed with the gas in proportion to the amount of combustion exhaust from the engine. As the gas-water mixture passes through the tube, the water droplets and particulate matter are separated from the gas by a combination of centrifugal force and their own weight as the gas stream is slowed down within the tube.

U.S. Pat. No. 4,300,924 discloses an exhaust gas scrubber which includes a closed tank partially filled with water and a core assembly positioned within the tank. The assembly includes a vertical cylindrical mixing tube open at its opposite ends and extending above and below the water level, an upwardly open cylindrical deflector cup at the bottom of the tank with its opening concentrically spaced within the lower end of the mixing tube, and a downwardly opening cylindrical deflector hood concentrically receivng the upper end of the mixing tube. Exhaust gases are introduced into the tank through a gas inlet tube which extends downwardly concentrically through the deflector hood and mixing tube. The gas inlet tube includes an open cover end. The gases flowing through the inlet tube discharge into the deflector cup and are deflected upwardly by the cup to pass through the annular opening between the gas inlet tube and the mixing tube. As the gases enter this annular opening they aspirate water droplets. The water droplets and gases intermix as the gases rise through the annular opening, and the mixture is deflected downwardly by the deflector hood towards the pool of water. The water droplets return to the pool while the gases are expelled from the tank through an opening in the tank.

While it has been suggested by the prior art devices to clean and cool hot exhaust gases by passing the exhaust gases through a pool of water or entraining water droplets in a hot exhaust gas flow, there is a need for an improved scrubber-exhaust gas conditioner of small enough size to enable direct connection with an internal combustion engine manifold which efficiently cools the hot exhaust gas to provide a safe working environment for mine personnel. The improved scrubber-exhaust gas conditioner must be capable of achieving good contact and mixing of the exhaust gas and liquid within the conditioner. In addition, the scrubber-exhaust gas conditioner must be capable of achieving a high degree of recovery of the liquid after the exhaust gas is cooled to minimize liquid usage. The scrubber-exhaust gas conditioner must have a simple construction to reduce manufacturing and replacement costs and facilitate inspection of the conditioner components.

SUMMARY OF THE INVENTION

In accordance with the present invention there is provided an apparatus for cooling and cleaning hot exhaust gas that includes an enclosure partially filled with a body of liquid. The enclosure has an inlet for receiving the hot exhaust gas and an outlet positioned above the body of liquid. A conditioning device having a hollow interior portion is positioned within the enclosure. The conditioning device has an inlet portion connected with the enclosure inlet for receiving the hot exhaust gas and an outlet portion which opens into the interior of the enclosure above the liquid. The conditioning device includes a liquid induction section submerged in the liquid which forms a part of a wall of the conditioning device. Liquid is drawn into the hollow interior of the conditioning device as the hot exhaust gas is passed through the liquid induction section. The liquid is entrained in the flow of hot exhaust gas to form a hot exhaust gas-liquid mixture. The conditioning device further includes a contact section for intimately mixing the hot exhaust gas and liquid after the hot exhaust gas is passed through the liquid induction section. The hot exhaust gas is cooled by the liquid within the contact section through vaporization of at least a portion of the liquid. Means integral with the contact section changes the direction of flow of the cooled exhaust gas-liquid mixture exiting the contact section. The change in direction of the cooled exhaust gas-liquid mixture separates the liquid from the cooled exhaust gas by centrifugal action. The liquid passes through the conditioning device outlet and returns to the body of liquid in the enclosure. The cooled exhaust gas separated from the liquid exits the conditioning device outlet portion and is passed through the enclosure outlet to atmosphere.

Further in accordance with the present invention there is provided a method for cooling hot exhaust gas which includes the steps of introducing hot exhaust gas into a conditioning device positioned in an enclosure partially filled with a body of liquid. The hot exhaust gas is passed through a conditioning device liquid induction section which is submerged in the liquid to introduce a portion of the liquid into the hot exhaust gas and form a hot exhaust gas-liquid mixture. The method includes the further steps of intimately mixing the hot exhaust gas and liquid by passing the hot exhaust gas and liquid through a conditioning device contact section, and cooling the hot exhaust gas within the contact section by vaporization of at least a portion of the liquid. The method also includes the step of passing the cooled exhaust gas-liquid mixture through a separator section which changes the direction of flow of the cooled exhaust gas-liquid mixture and separates the cooled exhaust gas from the liquid by centrifugal action. After separation, the liquid is returned to the body of liquid within the enclosure, and the cooled exhaust gas is passed through an outlet opening in the enclosure to atmosphere.

Accordingly, the principal object of the present invention is to provide an apparatus and method for cooling and cleaning hot exhaust gas containing particulates by entraining liquid within a flow of hot exhaust gas and, after cooling the hot exhaust gas by vaporization of at least a portion of the liquid, separating the liquid and particulates from the cooled exhaust gas by centrifugal action.

Another object of the present invention is to provide an apparatus for cooling and cleaning hot exhaust gas in which a hot exhaust gas-liquid mixture is accelerated during the exhaust gas cooling stage to permit separation of the liquid and particulates from the cooled exhaust gas by centrifugal action.

A further object of the present invention is to provide an apparatus for cooling and cleaning hot exhaust gas which may be easily connected to an internal combustion engine exhaust manifold to act as a flame and spark arrestor and provide a positive barrier against discharge of flames or sparks directly from the manifold to atmosphere.

Yet another object of the present invention is to provide an apparatus for cooling and cleaning hot exhaust gas in which a high degree of recovery of the cooling and cleaning liquid is achieved to minimize liquid usage.

These and other objects of the present invention will be more completely disclosed and described in the following specification, the accompanying drawings and the appended claims.

BRIEF DESCRIPTION OF THE DRAWINGS

FIG. 1 is a partial fragmentary, perspective view of a scrubber-exhaust gas conditioner, illustrating a conditioning device for cooling and cleaning hot exhaust gas positioned within an enclosure partially filled with liquid.

FIG. 2 is a sectional view in side elevation of the scrubber-exhaust gas conditioner shown in FIG. 1, illustrating the conditioning device positioned within the enclosure and the flow of gas and liquid within the enclosure.

DESCRIPTION OF THE PREFERRED EMBODIMENT

Figure 3:
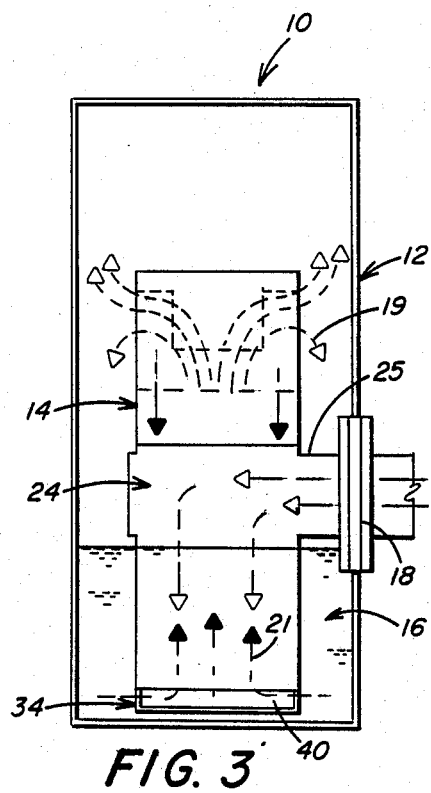
FIG. 3 is a view in front elevation of the scrubber-exhaust gas conditioner shown in FIG. 1, illustrating a conditioning device positioned within an enclosure and partially submerged in a pool of liquid.

Referring to the drawings, and particularly to FIGS. 1 through 3, there is illustrated an exhaust gas scrubber-conditioner generally designated by the numeral 10 for connection to an internal combustion engine exhaust manifold. The exhaust gas scrubber-conditioner 10 receives hot exhaust gas delivered from the internal combustion engine, and the hot exhaust gas is passed through the scrubber-conditioner to cool the hot exhaust gas and remove particulates suspended in the exhaust gas flow. The exhaust gas scrubber-conditioner 10 is also operable to cool hot exhaust gas that contains no particulates or hot exhaust gas that has previously been filtered to remove particulates suspended in the gas flow. The exhaust gas scrubber-conditioner generally designated by the numeral 10 is of small enough size to make direct connection to the internal combustion engine exhaust manifold practical.

Exhaust gas scrubber-conditioner 10 includes an enclosure 12 and a conditioning device generally designated by the numeral 14 positioned within the enclosure 12. Conditioning device 14 may be rigidly secured within enclosure 12 by any suitable means. The enclosure 12 is partially filled with a pool of liquid 16. The level of the liquid pool 16 within enclosure 12 may be controlled within a narrow range by suitable means, such as by a float actuated valve (not shown). As will be explained later in greater detail, the level of the liquid pool 16 is controlled to provide that the level of liquid pool 16 is below the outlet of conditioning device 14. Although also not shown in the Figures, it should be understood that a separate liquid supply tank is positively interconnected with enclosure 12 and provides make-up liquid to enclosure 12 as a portion of the liquid within enclosure 12 is evaporated during the hot exhaust gas cooling process.

Although the liquid referred to herein is not specifically identified, it should be understood that the liquid used to cool hot exhaust gas delivered from an internal combustion engine is water. However, any suitable liquid capable of cooling hot exhaust gas may be selected as a cooling agent so long as the liquid is capable of withstanding hot exhaust gas temperatures without igniting or creating other hazardous conditions.

In order to illustrate the flow of exhaust gas and liquid through enclosure 12 and conditioning device 14, the flow of exhaust gas within exhaust gas scrubber-conditioner 10 is designated in the Figures by the directional arrows 19 and the flow of liquid is designated by the directional arrows 21.

The enclosure 12 includes an inlet 18 and an outlet 20. Hot exhaust gas supplied from an internal combustion engine exhaust gas manifold is introduced into the exhaust gas scrubber-conditioner 10 at enclosure inlet 18. After the hot exhaust gas is cleaned and cooled within conditioning device 14, the cleaned and cooled exhaust gas exits exhaust gas scrubber-conditioner 10 at enclosure outlet 20. Enclosure 12 also includes a removable cover 22 to facilitate cleaning of the inside of enclosure 12 and servicing of conditioning device 14. Cover 22 is secured to enclosure 12 in such a manner that it cannot be dislodged from enclosure 12 by the cooled and cleaned exhaust gas exiting conditioning device 14 and flowing towards enclosure outlet 20.

Conditioning device 14 has a hollow interior 15 and includes an inlet section 24 which is connected to enclosure inlet 18 by a hollow tube section 25. Hot exhaust gas entering enclosure 12 at enclosure inlet 18 passes through the hollow tube section 25 and into conditioning device 14 inlet section 24. Inlet section 24 is formed from a pair of side walls 26, an outside wall 28 and inside wall 30 arranged in a generally rectangular cross-sectional configuration. Inlet section 24 also includes a top wall or cover 32 to prevent hot exhaust gas entering conditioning device 14 at inlet section 24 from escaping into the interior of the enclosure 12. Although inlet section 24 has a generally rectangular cross-sectional configuration, it should be understood that inlet section 24 may be constructed to have any desired cross-sectional configuration. For example, inlet section 24 may be constructed to have an oval or circular cross-sectional configuration.

As seen in FIGS. 1 and 2, inlet section 24 extends downwardly within enclosure 12 and is partially submerged in the pool of liquid 16. Although not illustrated in the Figures, inlet section 24 may be positioned horizontally within enclosure 12 if desired. If inlet section 24 is positioned horizontally within enclosure 12, suitable means such as tubing or piping must be provided to connect inlet section 24 with enclosure inlet 18. Connected to and integral with inlet section 24 is a liquid induction section generally designated by the numeral 34. Liquid induction section 34 has a generally arcuate configuration. Liquid induction section 34 includes a pair of side walls 26, an inside wall 36 and an outside wall 38 arranged to provide that the hollow interior 15 of conditioning device 14 in the area of liquid induction section 34 has a generally rectangular cross-sectional configuration.

As seen in FIGS. 1 and 2, the outside wall 38 of liquid induction section 34, the inside wall 30 of inlet section 24, and the side walls 26 of liquid induction section 34 are arranged to provide an opening 40 within liquid induction section 34. Hot exhaust gas entering conditioning device 14 inlet section 24 is passed through liquid induction section 34, and since liquid induction section 34 is submerged in the pool of liquid 16, venturi action takes place as the hot exhaust gas is passed across opening 40 to introduce and entrain liquid into the hot exhaust gas-stream. As with inlet section 24, liquid induction section 34 may be constructed to have an oval or circular cross-sectional configuration if desired.

It should be understood that prior to operation of scrubber-conditioner 10, that portion of conditioning device 14 submerged in the liquid pool 16 will be filled with liquid. However, as hot exhaust gas is initially passed through conditioning device 14 upon start-up of the engine, the liquid will be pushed out of conditioning device 14 by the exhaust gas into the liquid pool 16.

After the hot exhaust gas has been passed through liquid induction section 34 and liquid introduced and entrained in the hot exhaust gas stream, the hot exhaust gas-liquid mixture is passed through a conditioning device 14 contact section generally designated by the numeral 42.

Contact section 42 is partially submerged in the liquid pool 16 and extends upwardly within enclosure 12 from arcuate liquid induction section 34. Contact section 42 is formed from a pair of side walls 26, an outside wall 44 and an inside wall 46 arranged to provide that the hollow interior 15 of conditioning device 14 in the area of contact section 42 has a generally rectangular cross-sectional configuration. Although contact section 42 is illustrated in the Figures as having a generally rectangular cross-sectional configuration, it should be understood that contact section 42 may have any desired cross-sectional configuration, such as circular or oval. Contact section 42 will generally have the same cross-sectional configuration as inlet section 24 and liquid induction section 34.

As seen in FIGS. 1 and 2, the inside wall 46 of contact section 42 may be tapered relative to outside wall 44 if desired to provide that the cross-sectional area within contact section 42 continually decreases from the inlet 48 of contact section 42 to the outlet 50 of contact section 42. If inside wall 46 is tapered relative to outside wall 44, the continually decreasing cross-sectional area of the hollow interior 15 of contact section 42 will cause the hot exhaust gas-liquid mixture to increase in velocity as the hot exhaust gas-liquid mixture is passed from the inlet 48 to the outlet 50 of contact section 42. Within contact section 42 the hot exhaust gas is cooled through the vaporization of a portion of the liquid entrained in the hot exhaust gas stream.

After the hot exhaust gas is cooled by the vaporization of the entrained liquid within contact section 42, the cooled exhaust gas-liquid mixture is introduced into an arcuate separator section generally designated by the numeral 52. As the cooled exhaust gas-liquid mixture exits contact section 42 at outlet 50, the direction of flow of the cooled exhaust gas-liquid mixture is changed due to the arcuate configuration of separator section 52.

As seen in FIGS. 1 and 2, separator section 52 is formed from a pair of side walls 26, an outside wall 54 and an inside wall 56 arranged to provide that the hollow interior 15 within the area of separator section 52 has a generally rectangular cross-sectional configuration. Although separator section 52 is described herein as having a generally rectangular cross-sectional configuration, separator section 52 will have the same cross-sectional configuration as contact section 42, liquid induction section 34 and inlet section 24. Thus, if these sections all have an oval or circular cross-sectional configuration, separator section 52 will have a matching cross-sectional configuration. In addition, if it is desired to increase the velocity of the cooled exhaust gas-liquid mixture within separator section 52, the inside wall 56 may be rolled to provide that the cross-sectional area of hollow interior 15 within separator section 52 continually decreases from the inlet 58 of separator section 52 to the outlet 60 of separator section 52. The velocity of the cooled exhaust gas-liquid mixture passed through separator section 52 continually increases due to the continual decrease in the cross-sectional area of the interior 15 of separator section 52.

As described, the velocity of the exhaust gas-liquid mixture may be continually increased as the mixture is passed through contact section 42 and separator section 52. Although both contact section 42 and separator section 52 are described herein as having continually decreasing cross-sectional areas to increase the velocity of the cooled exhaust gas-liquid mixture, conditioning device 14 will also efficiently cool and clean hot exhaust gas if contact section 42 and separator section 52 each have a uniform or constant cross-sectional area.

The generally arcuate configuration of outside and inside walls 54, 56, respectively, of separator section 52 cause a change in the direction of flow of the cooled exhaust gas-liquid mixture and this change in direction causes the liquid and any entrained particulates to be separated.

Separation occurs through centrifugal action within separator section 52. Centrifugal force drives the liquid and particulates to flow along outside wall 54. The cooled exhaust gas, which is lighter than the liquid and particulates, flows along the inside wall 56 of separator section 52 and passes through an opening 62 in separator section 52 inside wall 56. The liquid and particulates are prevented from escaping laterally from separator section 52 by the side walls 26, and are forced to pass through the opening 64 in the outlet 60 of separator section 52.

After the liquid and particulates pass through the opening 64 in outlet 60 of separator section 52, the liquid and particulates pass through conditioning device 14 outlet portion 66. As seen in FIGS. 1 and 2, outlet portion 66 is connected with separator section 52 outlet 60. The conditioning device outlet portion 66 has an outlet opening 70 which is larger in cross-sectional area than the opening 64 in outlet 60 of separator section 52.

Outlet portion 66 includes a scalper plate 68 which separates entrained liquid and steam from the cooled exhaust gas not previously separated by passing the cooled exhaust gas-liquid mixture through separator section 52. The liquid and particulates are discharged through the opening 70 in conditioning device outlet portion 66 and fall into the liquid pool 16.

The cooled and cleaned exhaust gas exiting conditioning device 14 at opening 62 in separator section 52 flows through the interior of enclosure 12 and is passed through enclosure outlet 20 to atmosphere. If it is desired to remove additional liquid entrained in the cooled exhaust gas, a plate 72 may be positioned within enclosure 12 in the flow path of the cleaned and cooled exhaust gas. The plate 72 spans the width of enclosure 12, and the cleaned and cooled exhaust gas exiting conditioning device 14 impinges on plate 72 before exiting enclosure 12 at outlet 20. As the cleaned and cooled exhaust gas impinges on the wall 76 of plate 72, liquid still entrained in the cleaned and cooled gas is separated from the gas and flows down the wall 76 to return to the liquid pool 16. After the entrained liquid is removed from the exhaust gas, the gas flows beneath the bottom 74 of plate 72 and out of enclosure 12 through outlet 20.

Figure 4:
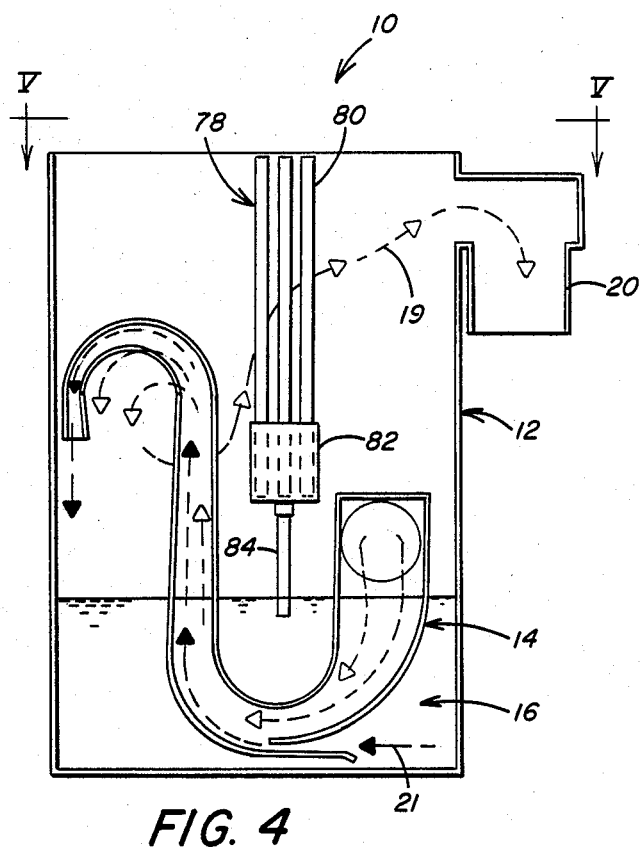
FIG. 4 is a sectional view in side elevation illustrating the conditioning device positioned within the enclosure and an alternate impingement device positioned within the enclosure to remove liquid droplets from exhaust gas which has been cooled and cleaned.
Figure 5:
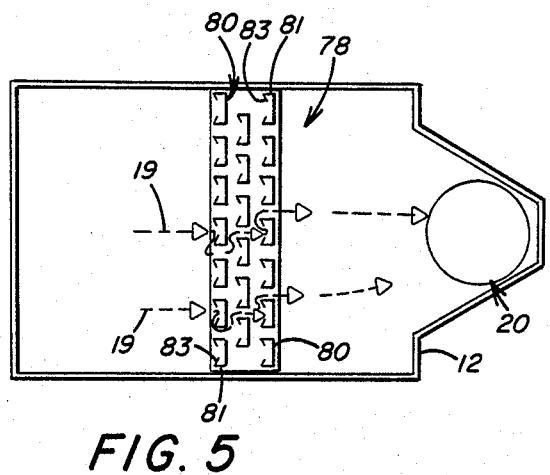
FIG. 5 is sectional view taken along line V—V of FIG. 4 illustrating the arrangement of the vertically extending channels of the alternate impingement device.

Referring to FIGS. 4 and 5, there is illustrated an alternate impingement-type device operable to remove additional liquid from the cleaned and cooled gas after the gas has passed through the opening 62 in separator section 52. As seen in FIGS. 4 and 5, the alternate impingement device 78 includes a plurality of vertically extending channels 80 positioned in the flow path of the cleaned and cooled exhaust gas. Each of the channels 80 has a pair of vertically extending lateral sides 81 and the ends of the lateral sides 81 are bent to form a pair of inwardly bent edge portions 83. The cleaned and cooled gas is forced to pass between the plurality of vertically extending channels 80, and as the cleaned and cooled gas impinges on the channels 80, liquid still entrained in the cleaned and cooled exhaust gas is deposited on the surfaces of the channels 80. Additional liquid is removed from the cooled exhaust gas as the cooled exhaust gas is forced to flow along the lateral sides 81 of the channels 80 and around the inwardly bent edge portions 83. The liquid flows down the surfaces of the channels 80 and the surfaces of the inwardly bent edge portions 83 to be collected in a trough 82. The liquid collected in trough 82 passes through a discharge pipe 84 and is returned to the liquid pool 16.

As described, exhaust gas scrubber-conditioner 10 provides many advantages over known exhaust gas conditioners. Exhaust gas scrubber-conditioner 10 is small enough in size to make direct connection to an internal combustion engine exhaust manifold practical, and acts as a flame and spark arrester to provide a positive barrier against the discharge of flames or sparks from the manifold directly into a hazardous atmosphere. In addition, the design of the scrubber-conditioner provides for good contact and mixing of the hot exhaust gas and liquid, and achieves a high degree of exhaust gas cooling and recovery of entrained liquid. Since the interior of the conditioning device is not filled with liquid, minimum back pressure on the internal combustion engine is also achieved since the hot exhaust gas is not forced through a volume of liquid.

According to the provisions of the Patent Statutes, I have explained the principle, preferred construction and mode of operation of my invention and have illustrated and described what I now consider to represent its best embodiment. However, it should be understood that within the scope of the appended claims, the invention may be practiced otherwise than as specifically illustrated and described herein.

I claim:

1. An apparatus for cooling and cleaning hot exhaust gas containing particulates comprising, an enclosure partially filled with a body of liquid, said enclosure having an inlet for receiving said hot exhaust gas and an outlet opening above said liquid, gas conditioning means having a hollow interior portion positioned within said enclosure, said gas conditioning means having an inlet portion connected to said enclosure inlet for receiving said hot exhaust gas and an outlet portion communicating with said enclosure outlet opening and with the interior of said enclosure.

liquid induction means in said gas conditioning means for introducing said liquid into said gas conditioning means hollow interior portion, said liquid in said gas conditioning means arranged to mix with said hot exhaust gas to form a hot exhaust gas-liquid mixture, said conditioning means including a contact portion for intimately mixing said hot exhaust gas and said liquid after said hot exhaust gas flows past said liquid induction means, said hot exhaust gas being cooled by said liquid within said gas conditioning means contact portion.

said conditioning means including a separator portion for changing the direction of flow of the cooled exhaust gas-liquid mixture flowing from said contact portion so that a substantial portion of said liquid and particulates separate from said cooled exhaust gas by centrifugal action, said separator portion having an arcuate configuration for changing the direction of said cooled exhaust gas-liquid mixture flowing from said contact portion, said separator portion having an outside arcuate wall and an inside arcuate wall, said change in direction of flow of said liquid, particulates and gas operable to separate at least a portion of said liquid and particulates from said cooled exhaust gas by centrifugal action, said separator portion having an exhaust gas opening in said inside arcuate wall and a liquid opening at the end of said inside and outside arcuate walls, said cooled exhaust gas separated from said liquid and particulates passing through said exhaust gas opening in said arcuate inside wall of said separator portion and said liquid and particulates passing through said liquid opening in a direction downwardly toward said body of liquid, a flow barrier positioned within said enclosure in the path of travel of said cooled exhaust gas between said conditioning means outlet portion and said enclosure outlet, said cooled exhaust gas arranged to strike said flow barrier and change direction of flow and flow beneath said barrier to thereby remove additional liquid entrained in said cooled exhaust gas, and said cooled and cleaned exhaust gas separated from said liquid and particulates arranged to flow around said barrier and through said enclosure outlet opening to the atmosphere.

2. An apparatus for cooling and cleaning hot exhaust gas containing particulates as set forth in claim 1 in which said barrier includes, a plurality of vertically extending channel means positioned within said enclosure in the path of travel of said cooled exhaust gas between said conditioning means outlet portion and said enclosure outlet, said cooled exhaust gas arranged to flow between said plurality of channel means and strike a portion of said channel means to remove said additional liquid entrained in said cooled exhaust gas.

3. An apparatus for cooling and cleaning hot exhaust gas containing particulates as set forth in claim 1 in which, said conditioning means outlet portion facing said body of liquid in said enclosure.

4. An apparatus for cooling and cleaning hot exhaust gas containing particulates as set forth in claim 1 in which, said inlet portion being at least partially submerged in said liquid and extending within said enclosure to said liquid induction means, said liquid induction means having an arcuate configuration said arcuate liquid induction means being at least partially submerged in said liquid and having an opening in a wall thereof through which said liquid is introduced into the hollow interior portion of said conditioner means, said contact portion extending upwardly from said arcuate liquid induction means to a separator portion, said contact portion having cross-sectional area arranged to increase the velocity of said hot exhaust gas-liquid mixture through said contact portion, said hot exhaust gas being cooled by said liquid within said contact portion through vaporization of at least a portion of said liquid.

5. An apparatus for cooling and cleaning hot exhaust gas containing particulates as set forth in claim 4 in which, said opening in said arcuate liquid induction portion having cross-sectional configuration arranged to span a width of said liquid induction section.

6. A method for cooling and cleaning hot exhaust gas containing particulates comprising the steps of, introducing hot exhaust gas into a conditioning means positioned within an enclosure partially filled with liquid, passing said hot exhaust gas through a liquid induction portion of said conditioning means, introducing a portion of said liquid in said enclosure into said conditioning means and into the stream of said hot exhaust gas flowing through said liquid induction portion of said conditioning means, intimately mixing said hot exhaust gas and said liquid in a contact portion of said conditioning means, cooling said hot exhaust gas within said contact portion by said liquid, changing the direction of flow of said the stream of cooled exhaust gas-liquid mixture in a separating portion and separating at least a portion of said liquid and particulates from said cooled exhaust gas by centrifugal action, discharging a substantial portion of said cooled exhaust gas from said conditioning means through an opening in an arcuate inside wall of said separating portion into said enclosure and discharging a stream including said liquid and particulates from a second opening in said separating portion in a direction downwardly toward said surface of said body of liquid, and impacting said stream of cooled exhaust gas leaving said condition means and flowing through said enclosure against a flow barrier and removing additional liquid entrained in said cooled exhaust gas.

7. A method for cooling and cleaning hot exhaust gas containing particulates as set forth in claim 6, including, positioning a plurality of vertically extending channel means within said enclosure in the path of travel of said cooled exhaust gas stream leaving said conditioning means, with said cooled exhaust gas stream flowing between said channel means and impacting on a portion of said channel means to remove additional liquid entrained in said cooled exhaust gas.

* * * * *